Dec. 29, 1953  J. K. RUSSELL  2,663,963
UNIVERSAL LEADER CONNECTION FOR LURES
Filed April 8, 1950  2 Sheets-Sheet 2
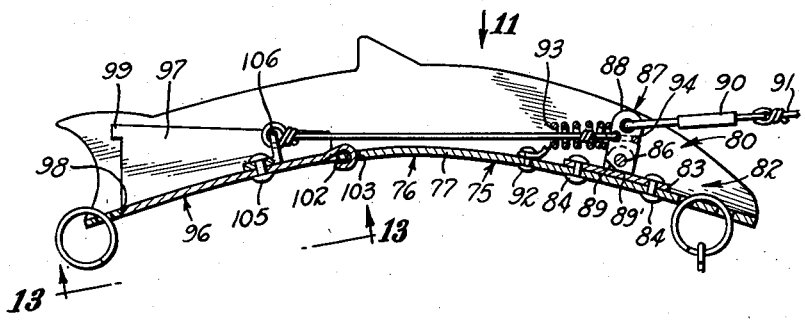
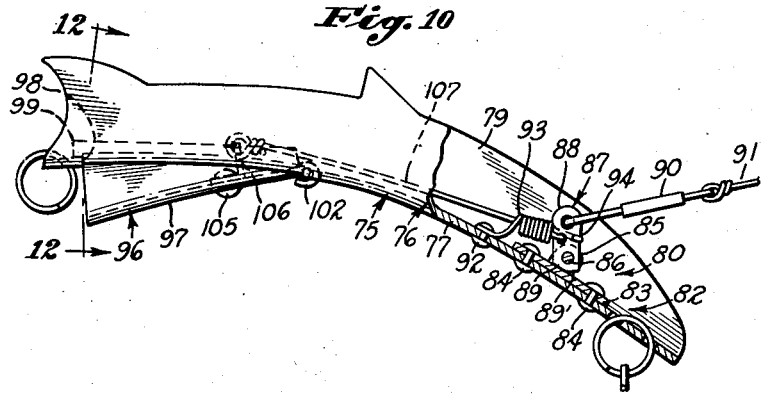
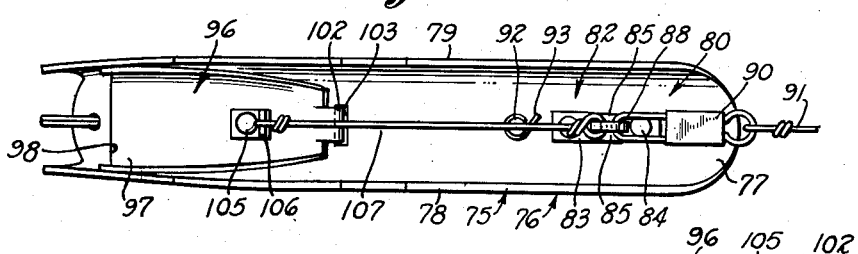
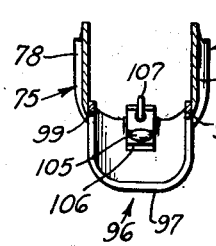
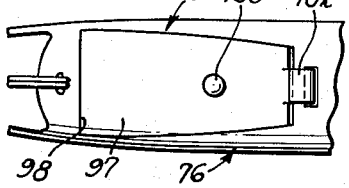
INVENTOR:
JOHN K. RUSSELL
BY HIS ATTORNEYS
HARRIS, KIECH, FOSTER & HARRIS Patented Dec. 29, 1953

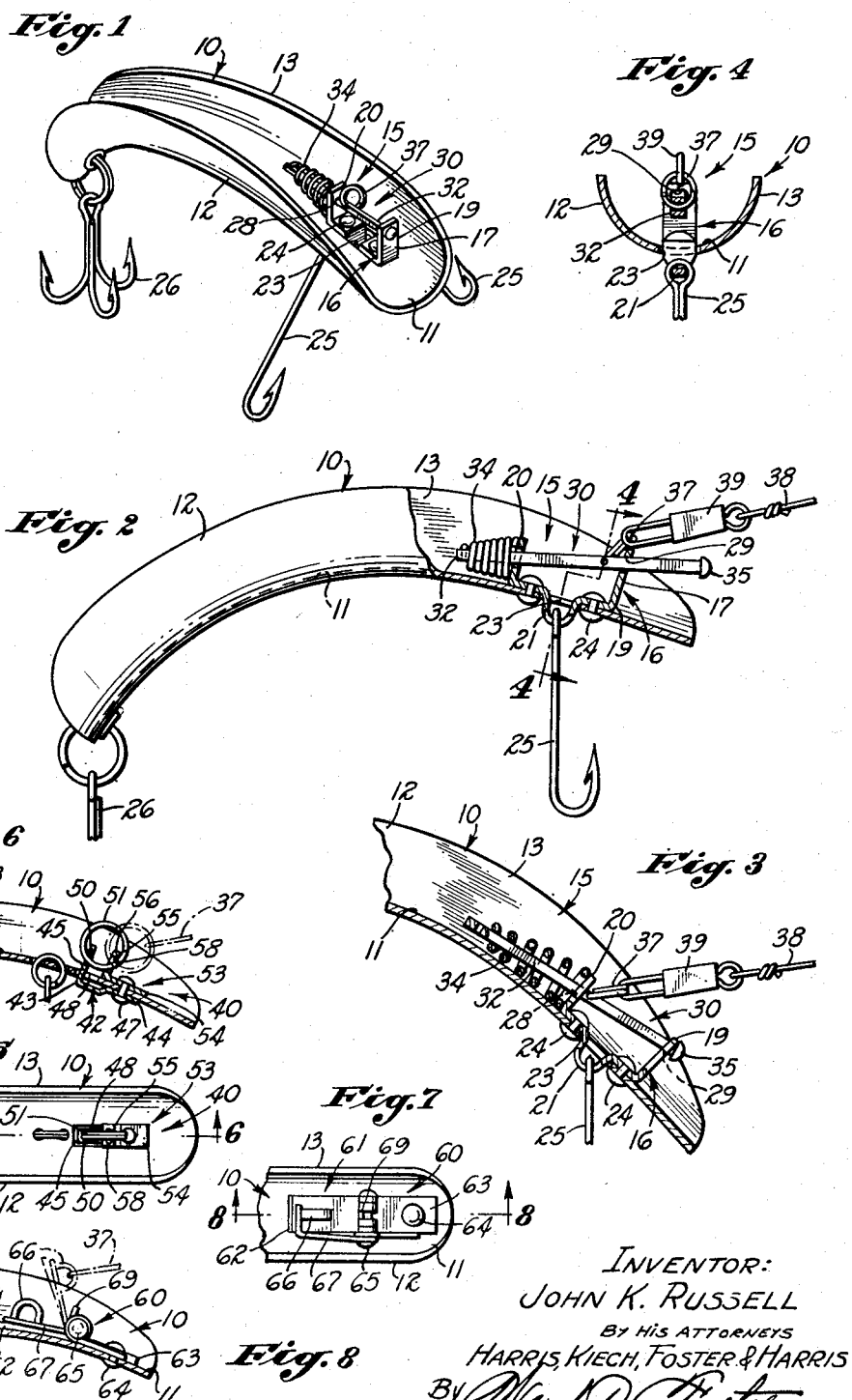

2,663,963

UNITED STATES PATENT OFFICE 2,663,963

UNIVERSAL LEADER CONNECTION FOR LURES

John K. Russell, North Hollywood, Calif.

Application April 8, 1950, Serial No. 154,783

10 Claims. (Cl. 43—42.02)

This invention relates to improvements in leader connections for lures and more particularly to a universal leader connection for lures which is adapted to assume one of a plurality of positions in respect to the body of the lure with which it is associated.

It is customary, at the present time, to provide identical lure bodies with single leader connections which are positioned at different points upon the lure bodies, it being necessary for the fisherman to carry a large number of lures to insure that there will be available a lure of that type having the leader connection positioned at the proper point upon the lure. However, the use of such conventional lures is not satisfactory since the selection of the point to which the lure will be attached is necessarily dependent upon the judgment of the fisherman and since the point of attachment of the leader connection to the lure body is not always the optimum point under all conditions of use.

I have previously disclosed, in Patent No. 2,484,747, a lure provided with a plurality of leader connections disposed at different points upon the body of the lure to permit the leader to be connected at any one of said points. I have also disclosed in said patent the concept that, in addition to controlling the movement of the lure by the placement of the leader connections, varying the height of the connections will also affect the movement of the lure. However, there is naturally a limit to the number of connections which can be provided and the points at which they can be disposed and I have found that a more flexible construction which will permit the lure to automatically adapt itself to the conditions under which it is used, is to be preferred.

It is, therefore, an object of my invention to provide a universal leader connection for lures which is capable of automatic movement between a first position and a second position, the first and second positions defining the utilmate and optimum limits of travel of the leader connection in reference to the body of the lure. Thus, when a lure equipped with a universal leader connection constructed in accordance with my invention is utilized, the point of attachment of the leader to the lure is automatically controlled by the condition of the water in which the lure is immersed or by the manner in which the lure is pulled through the water. Therefore, the point of attachment of the leader to the lure is at all times disposed in its optimum position and the lure is thus caused to function in the most effective and life-like manner.

Another object of my invention is the provision of a universal leader connection for lures which includes a link-bearing member having associated therewith a link to permit the attachment thereto of the end of the leader, said link-bearing member being movable to cause it to carry said link between a first, rearward position and a second, forward position in reference to the body of the lure and to permit the assumption by the link of an optimum position in reference to the body of the lure as determined by the conditions under which the lure is utilized.

A further object of my invention is the provision in a universal leader connection for lures of means for retaining the aforementioned link-bearing member in the first, rearward position when the link supported thereupon is subjected to little or no load by the leader connected thereto, but which will permit the movement of said link-bearing member from said first, rearward position in reference to the body of the lure into any one of a plurality of positions between said first position and the second, forward position. It is an associated object of my invention to provide a retaining means for the link-bearing member which includes a spring element adapted to cause the link-bearing member to function in the manner above-described.

An additional object of my invention is the provision of a universal leader connection for lures in which the link-bearing member is longitudinally movable in reference to the body of the lure and in which it is also moved upwardly as it moves forwardly. In other words, as the link-bearing member is longitudinally translated between the first, rearward position and the second, forward position the movable link-bearing member is carried between a first, lowermost position to a second, uppermost position.

A further object of my invention is the provision in a universal leader connection of the aforementioned type of stop means adapted to limit the forward and upward movement of the link-bearing member and its associated link to prevent the link-bearing member from being longitudinally translated beyond the second, forward position.

Another object of my invention is the provision of a lure having associated therewith a universal leader connection including a link-bearing member movable through a plurality of positions between a first position and a second position, said lure including positioning means associated with and controllable by the link-bearing member.

An additional object of my invention is the provision of a lure having a body which is provided with a movable positioning means for controlling the movement and attitude of the lure, said positioning means being operable by the the aforesaid link-bearing member.

A further object of my invention is the provision of a lure body having a body, a portion of which constitutes a positioning means adapted to control the attitude and movement of the lure, said positioning means being attached to the aforesaid link-bearing member and being movable between a first, uppermost position and a second lowermost position as the link-bearing member is moved from its second, forward position to its first, rearward position.

An additional object of my invention is the provision of a universal leader connection of the aforementioned type which is constituted by a minimum number of component parts and which can be readily and cheaply manufactured.

Other objects and advantages of my invention will be apparent from the following specification and the accompanying drawings, which are for the purpose of illustration only, and in which:

Fig. 1 is a perspective view showing a universal leader connection constructed in accordance with my invention mounted on a lure;

Fig. 2 is an enlarged, partly sectional side elevation showing the link-bearing member and the associated link of the leader connection in the second, forward position;

Fig. 3 is an enlarged fragmentary, sectional view showing the link-bearing member and its associated link in the first, rearward position;

Fig. 4 is a vertical sectional view taken on the broken line 4—4 of Fig. 2;

Fig. 5 is a fragmentary plan view of a lure body showing an alternative embodiment of the universal leader connection secured thereto;

Fig. 6 is a fragmentary, vertical sectional view taken on the broken line 6—6 of Fig. 5;

Fig. 7 is a fragmentary plan view of a lure having embodied therein another embodiment of a leader connection constructed in accordance with my invention;

Fig. 8 is a fragmentary, vertical sectional view taken on the broken line 8—8 of Fig. 7;

Fig. 9 is a longitudinal, partly sectional view of a lure incorporating another embodiment of my invention;

Fig. 10 is a longitudinal, partly sectional view;

Fig. 11 is a top plan view taken in the direction of the arrow 11 of Fig. 9; and Fig. 12 is a vertical, partly sectional view taken from the broken line 12—12 of Fig. 10.

Referring to the drawings and particularly to Fig. 1 thereof, I show a lure 10 having a bottom portion 11 which is transversely curved and side walls 12 and 13 which continue the curvature of the bottom portion 11. The bottom portion 11 and the side walls 12 and 13 together form a trough through which the water in which the lure is immersed may flow. The lure body is formed on a longitudinal arc, as most clearly shown in Fig. 2 of the drawings.

Positioned adjacent, but spaced from, the forward end of the lure 10 within the trough constituted by the walls 12 and 13 and the bottom portion 11 is a universal leader connection 15 constructed in accordance with my invention. The universal leader connection 15 is secured to the lure 10 by mounting means 16 which includes a substantially U-shaped bracket 17 having forward and rearward upwardly directed legs 19 and 20 and an intermediate portion 21.

An opening 23 is formed in the bottom portion 11 of the lure 10 and is adapted to receive the intermediate portion 21 of the mounting bracket 17 which is fastened to the bottom portion 11 of the lure 10 by means of rivets 24 or similar fasteners. Secured to the intermediate portion 21 of the mounting bracket 17 is a hook 25. A triple hook 26 is secured to the rear end of the lure 10.

The rearward leg 20 of the U-shaped mounting bracket 17 is somewhat shorter than the forward leg 19 thereof and said rearward leg has an opening 28 formed therein which is spaced above the bottom portion 11 of the lure 10 while the forward leg 19 of the U-shaped mounting bracket 17 has an opening 29 formed therein which is spaced a greater distance above the bottom portion 11 of the lure 10 than the opening 28 in the rearward leg 20, for a purpose which will be described in greater detail below. Positioned in the openings 28 and 29 is a link-bearing member 30 constituted, in the present embodiment of my invention, by an elongated rectangular rod 32, the opposite ends of which project through the openings 28 and 29 and extend beyond the legs 20 and 19 of the U-shaped bracket 17. A conical spring 34 is attached to the rearward end of the rod 32 and has its base seated against the rearward leg 20 of the U-shaped bracket 17. Formed on the forward end of the rod 32 is a head 35 which is adapted to contact the forward leg 19 of the bracket when the spring 34 is expanded, as seen in Fig. 3 of the drawings. When the conical spring 34 is expanded, the head 35 prevents the further expansion of the spring and the rod 32 retains a link 37 mounted thereupon in the first, rearward position. The rod 32 and the link 37 constitute the leader engaging member of my invention and operate wholly within the forward portion of the lure. One end of a leader 38 is attached to the link 37 through the intermediary of a clip 39 and the lure, by this means, can be pulled through the water. When as best shown in Fig. 3 of the drawings, the lure is used in slow moving water or is pulled through the water at a slow rate of speed, the load imposed upon the spring 34 through the link 37 and the elongated, link-bearing rod 32 is not sufficient to cause the compression of the spring 34, and the link 37 and the link-bearing rod 32 will thus remain in the first, rearward position. When in this extreme rearward position the lure moves through the water in a lazy, deliberate fashion and simulates, to a certain extent, the appearance of a wounded or feeding fish.

When the lure is used in fast moving water or when the speed at which it is trolled is increased, the load imposed upon the conical spring 34 is increased sufficiently to cause the compression thereof and to cause the movement of the link 37 and its associated link-bearing rod 32 toward the second, forward position defined by the forward leg 19 of the U-shaped bracket 17. Thus, the link 37 and the link-bearing rod 32 can be moved through a variety of optimum positions for the particular speed of the water or for the particular trolling speed. When the link reaches the maximum forward position, as shown in Fig. 2 of the drawing, the forward leg 19 of the U-shaped bracket 17 serves as a stop by preventing the further movement of the link 37 and thus preventing the further movement of the rod 32 and any further compression of the spring 34.

As was indicated above, the opening 28 in the rearward leg 20 is lower than the opening 29 in the forward leg 19 thus causing the link-bearing rod 32 to be disposed at an angular position in reference to the bottom portion 11 of the lure 10. Therefore, when the lure is used in fast water or is trolled at a fast rate of speed and the load imposed upon the spring 34 through the link 37 and the rod 32 increases to cause the forward movement of the rod 32 and the link 37, the link 37 is also gradually moved upwardly on an angular path from a first, lowermost position adjacent the rearward leg 20 to a second, uppermost position adjacent the forward leg 19.

The vertical component of movement imparted to the link-bearing rod 32 and its associated link 37 by the above-described differences in spacing of the opposite ends of the rod above the bottom portion 11 of the lure 10 achieves a noteworthy result in that, when the lure is used in fast water or trolled through the water at a fast rate of speed and the link-bearing rod 32 and its associated link 37 are gradually moved from the first, rearward position to the second, forward position, the increase in the vertical distance of the link 37 and the rod 32 above the bottom portion 11 of the lure 10 serves to increase the length of the lever arm so that when the lure is traveling through the water at a fast rate of speed, the increased lever arm, when subjected to the increased load imposed thereupon by the leader 38, will tend to dampen any excessive eccentric or erratic movement induced in the lure by its fast travel through the water.

Shown in Figs. 5 and 6 of the drawings is a lure 10 equipped with an alternative embodiment of the universal leader connection of my invention. Parts of this embodiment identical with those of the previously discussed embodiment are identified by identical reference numerals. The universal leader connection 40 includes a first, link-bearing member 42 exemplified as a right angle bracket 43 having a supporting portion 44 and a resilient link-supporting portion 45.

The mounting portion 44 of the bracket 43 is secured to the forward portion of the lure 10 by means of a rivet 47, or similar fastening means. Formed in the bottom portion 11 of the lure 10 is a longitudinal aperture or slot 48 through which the resilient, link-supporting portion 45 of the bracket 43 projects to permit it to be positioned in the trough constituted by the bottom portion 11 and the side walls 12 and 13 of the lure 10. Formed in the upper end of the resilient, link-supporting portion 45 of the bracket 43 is an opening or hole 50 in which is positioned an annular link 51 adapted to receive a leader clip 37 to which the end of a leader is attached. It should be understood that the first, link-bearing member is positioned within the trough of the lure at a point which is the first, rearward position.

Secured in the trough of the lure by means of the rivet 47 is a second, link-bearing member 53 which is constituted by a rigid right angle bracket having a mounting portion 54 and a link-supporting portion 55, the end of which is adapted to serve as a stop 56, for a purpose which will be described in greater detail below. Formed in the link-supporting portion 55 of the second link-bearing member 53 is an oversized hole 58 in which is positioned the annular link 51. The link-supporting portion 55 of the link-bearing member 53 is located at a point on the bottom portion 11 of the lure 10 which is equivalent to a second, forward position of the first, link-bearing member 42.

When the lure 10 is used in slow moving water or is trolled in still water at a slow rate of speed, the resilient, link-supporting portion 45 of the first, link-bearing member 42 is sufficiently resistant to hold the link 51 mounted therein at the first, rearward position and to thus cause slow, deliberate movement of the lure through the water in the manner above-described.

When the lure is used in fast water or is trolled through still water at a faster rate of speed, the load imposed upon the annular link 51 by the leader increases and causes bending of the resilient, link-supporting portion 45 of the first, link-bearing member 42 and the consequent movement thereof between the first, rearward position and the second, forward position. As the load upon the link 51 increases, proportional bending of the resilient, link-supporting portion 45 takes place until the top end of the link-supporting portion 45 contacts the stop portion 56 of the second, link-bearing member 53. Thus, the stop portion 56 of the second, link-bearing member 53 prevents the movement of the first, link-bearing member 42 beyond the second, forward position. It will be noted, as in the preceding embodiment of my invention, that the movement of the resilient, link-supporting portion 45 carries the link 51 in an angular path so that the link 51 moves from a first, lowermost position to a second, uppermost position to achieve the increase in the lever arm and the results thereof which were described in the previous embodiment. The upward movement of the link 51 is attainable because the over-sized hole 58 permits the upward movement of the link 51.

Shown in Figs. 7 and 8 of the drawings is a lure equipped with another embodiment of my invention constituted by a universal leader connection 60. The universal leader connection 60 includes a link-bearing member 61 movable between a first, rearward position and a second, forward position and constituted by a hinge plate 62 which is movable upon a mounting plate 63, secured to the bottom portion 11 of the lure 10 by means of a rivet 64 or similar fastener, through a pintle 65. Supported upon and carried by the movable hinge plate 62 is a link 66 which is attached to the end of the leader by means of a leader clip 37. A rattrap spring 67 serves as the retaining means for the movable, link-bearing member 61 and acts to maintain said member in the first, rearward position and to permit its movement under load between said first, rearward position to a second, forward position.

Formed integrally with the mounting plate 63 is a stop means 69 constituted by a vertical finger which is adapted to prevent the movement of the movable hinge plate 62 beyond the second, forward position. In the operation of the device, when the lure is used in slow moving water or is trolled through still water at a slow speed, the load imposed upon the hinge plate 62 through the link 66 is not sufficient to overcome the resistance of the rattrap spring 67 and the link-bearing member 61 thus remains at the first, rearward position. However, when a greater load is imposed upon the movable hinge plate 62 by using the lure in fast water or trolling it through still water at a fast rate of speed, the resistance of the rattrap spring 67 is overcome and the hinge plate 62 is moved from the first, rearward position through a variety of positions until it ultimately reaches the second, forward position and is stopped by its contact with the stop member 69.

It will be noted that, as the hinge plate 62 carries the link 66 from the first, rearward position to the second, forward position the link 66 moves both forwardly and vertically and thus is carried by the hinge plate 62 between a first, lowermost position to a second, uppermost position to increase the lever arm imposed on the lure through the hinge plate 62 and its associated link 66 and thus to accomplish the results outlined in the above description in limiting and controlling the movement of the lure.

Shown in Fig. 9 of the drawings is another embodiment of my invention exemplified as a lure 75 having a lure body 76 formed of sheet metal and including a bottom portion 77 which is transversely curved and side walls 78 and 79 which continue the curvature of the bottom portion 77. The bottom portion 77 and the side walls 78 and 79 together form a trough through which the water in which the lure is immersed may flow. The lure body 76 is formed on a longitudinal arc having a substantially larger radius than the arc of the previously discussed lure, the present lure being much larger in size and being designed for use in ocean trolling. The larger radius of the arc is necessary to permit the lure to be utilized in ocean water conditions where the lure is trolled at higher speeds than in fresh water and is exposed to different water conditions.

Positioned adjacent, but spaced from, the forward end of the lure body 76 within the trough constituted by the walls 78 and 79 and the bottom portion 77 is a universal leader connection 80 constructed in accordance with my invention. The universal leader connection 80 includes a support 82 constituted, in part, by a mounting plate 83 which is fastened to the bottom portion 77 of the lure body 76 by means of rivets 84, or similar fasteners. Formed integrally with and projecting upwardly from the mounting plate 83 are spaced apart mounting ears 85 between which is supported, by means of a pin 86, the lower end of a link-bearing member 87.

The link-bearing member 87 is constituted, in the present embodiment of my invention, by a lever 88 which is movable between a first, rearward position (Fig. 10) and a second, forward position (Fig. 9). Supported in an opening formed at the upper end of the link-bearing member 87 is a leader link 90 to which is attached a leader 91, it being noted that the load imposed upon the leader 91 by the trolling of the lure 75 through the water or by the passage of water over and through the lure 75 is utilized to cause the movement of the link-bearing member 87 between the first, rearward position and the second, forward position and into any one of a plurality of positions intermediate said first, rearward position and second, forward position.

Formed on the lowermost end of the lever 88 are stop faces 89 and 89' respectively adapted to prevent the movement of the lever 88 beyond the first, rearward position and the second, forward position. As best seen in Fig. 9, when the lever 88 is urged into the second, forward position the stop face 89' contacts the upper surface of the mounting plate 83 and prevents the movement of the lever 88 beyond the second, forward position. Conversely, as best shown in Fig. 10 of the drawings, when the lever 88 is permitted to return to the first, rearward position the stop face 89 contacts the upper surface of the mounting plate 83 to prevent the movement of the lever 88 therebeyond.

Secured to the bottom portion 77 of the lure body 76, as by means of a rivet 92, is the rear end of a tension spring 93, the forward end of which is engaged in a notch 94 formed in the lever 88. The tension spring 93, as best shown in Fig. 10 of the drawings, biases the lever 88 into the first, rearward position and the lever 88 is moved between the first, rearward position and the second, forward position by the load imposed upon the lever 88 through the leader 91 to overcome the tension of the spring 93, as best shown in Fig. 9 of the drawings.

When, as best shown in Fig. 10 of the drawings, the lure 75 is trolled at a slow rate of speed, the load imposed upon the tension spring 93 is insufficient to cause the extension thereof and the lever 88 is retained in the first, rearward position. When in this extreme rearward position, the forward end of the lure is downwardly inclined and it moves through the water in a lazy, deliberate fashion simulating, to a certain extent, the appearance of a wounded or feeding fish. Conversely, when the speed at which the lure is trolled is increased, the load imposed upon the tension spring 93 is increased sufficiently to cause the extension thereof to permit the movement of the lever 88 from the first, rearward position toward the second, forward position. Thus, the lever 88 can be moved through a variety of optimum positions to accommodate the particular speed at which the lure is trolled. When the lever 88 reaches the maximum forward position, as shown in Fig. 9 of the drawings, the stop face 89' contacts the upper surface of the mounting plate 83 and prevents further forward movement thereof.

It will be noted that, as the lever 88 is moved between the first, rearward position and the second, forward position by the load imposed thereupon through the leader 91, the leader link 90 is carried upwardly in an angular path so that it is moved from a first, lowermost position to a second, uppermost position to achieve an increase in the lever arm exerted by the leader link upon the lever 88 so that, when the lure is traveling through the water at a fast rate of speed, the increased lever arm, when subjected to the increased load imposed thereupon by the leader 91, will tend to dampen any excessive, eccentric or erratic movement induced in the lure by its fast travel through the water.

Because the lure body 76 is formed on a relatively flat and large radius arc, I have provided the lure body 76 with positioning means 96 adapted to control the movement of the lure body 76 in conjunction with the link-bearing member 87, in a manner which will be described in greater detail below. The positioning means 96 is constituted, in part, by a substantially scoop-shaped segment 97, the base of which is located in a recess 98 formed in the lure body 76 and movable, as best indicated in Figs. 9 and 10 of the drawings, between a first, uppermost position and a second, lowermost position and disposable at any one of a plurality of positions intermediate said first and second positions. The rear upper end of the positioning means 96 is provided with stop fingers 99 adapted to engage the bottom portion 77 of the lure body 76 to limit the downward movement of the positioning means 96 and to prevent it from traveling beyond its second, lowermost position.

Formed integrally with the forward end of the positioning means 96 is a hinge ear 102 which is adapted to engage an opening 103 in the bottom portion 77 of the lure body 76, which construction thus permits the front end of the positioning means 96 to pivot with respect to the lure body 76. Secured to the surface of the positioning means 96, as by means of a rivet 105, and projecting upwardly into the trough constituted by the bottom portion 77 and the side walls 78 and 79 of the lure body 76 is a bracket 106. Pivotally engaging an opening in the uppermost end of the bracket 106 is the rearward end of a connecting rod 107, formed of wire or similar light stock, the forward end of which passes through the tension spring 93 and pivotally engages the lever 88.

Therefore, the positioning means 96, as constituted by the scoop-shaped member 97, is connected to the lever 88 of the universal leader connection 80 by means of the connecting rod 107 so that forward or rearward movement of the lever 88 as induced by the leader 91, results respectively in the upward or downward movement of the positioning means 96. As best shown in Fig. 9 of the drawings, when the lure 75 is drawn through the water at a relatively high rate of speed, the load imposed upon the universal leader connection by the leader 91 causes the link-bearing member 87 to be drawn into the second, forward position against the tension of the spring 93. When the link-bearing member 87 is drawn into the second, forward position, as indicated above, the movement thereof is transmitted through the connecting rod 107 to the positioning means 96 to cause the positioning means 96 to be drawn upwardly and retained in its first, upper position. When disposed in this position, the base of the positioning means 96 forms a continuous arc with the bottom portion 77 of the lure body 76 and the positioning means does not affect the attitude of the lure in the water nor the manner in which it passes therethrough.

However, when the lure is drawn through the water at a relatively slow rate of speed and the load imposed upon the universal leader connection 80 is thus reduced, the link-bearing member 87 is drawn into its first, rearward position by the action of the tension spring 93. The movement of the link-bearing member 87 into the first rearward position causes the simultaneous rearward shifting of the connecting rod 107 and the downward deflection of the positioning means 96, as best shown in Fig. 10 of the drawings. The downward movement of the positioning means 96 serves to shorten, to all intents and purposes, the arc upon which the under side of the lure is drawn and causes the action of the universal leader connection 80 to be supplemented by the thrust of water against the positioning means 96.

When the forward end of the lure is thus downwardly deflected, the lure effectively simulates the action of a wounded or feeding fish since the movement thereof becomes more deliberate and hesitant than is the case when the lure is disposed in the position shown in Fig. 9 of the drawings. Of course, the positioning means 96 can assume any one of a multiplicity of positions between the first, uppermost and the second, lowermost positions shown in Fig. 9 and 10 respectively. The positions assumed by the lure, as controlled by the action of the leader connection and the positioning means, are determined by the load imposed upon the universal leader connection by the leader itself.

In this manner I provide a universal leader connection for lures which is designed to permit the link to which the leader is attached to be automatically moved from a first, rearward and lowermost position to a second, forward and uppermost position. By the automatic movement of the link, the optimum position of the link in reference to the body of the lure is attained at all times, no matter what the conditions under which the lure is utilized may be. Another important feature of the invention is the increased lever arm through which the link may work as it moves from the rearward, lowermost position to the forward, uppermost position to achieve a snubbing effect when the lure is most active. Also provided by my invention is a stop means adapted to prevent the link from being carried beyond the forward, uppermost position.

Although I have shown and described preferred embodiments of my invention for the purpose of illustrating the construction and mode of operation thereof, it is obvious that changes, modifications and alterations may be made in the specific details of construction and I, therefore, do not desire to be limited to said specific details but prefer, rather, to be afforded the full scope of the patent claims.

I claim as my invention:

1. A lure body having a mounting wall and leader connecting means, a mounting secured to said wall, said mounting having portions thereof constituting limiting stops, turnable means adapted to rotate about an axis transverse of the longitudinal axis of the mounting and adapted to engage said stops and constituting linking means between said mounting and said leader connecting means, and resilient means associated with said mounting for normally maintaining the turnable means in engagement with one stop whereby slow movement of the leader connecting means will permit the turnable means to be held in one limited position by one stop, and a faster movement of the leader connecting means will permit the turnable means to be held in another limited position by the other stop.

2. A device as defined in claim 1 wherein said portions constituting limiting stops comprise rearward and forward legs projecting away from said mounting wall.

3. A device as defined in claim 2 wherein said legs contain aligned means defining apertures.

4. A device as defined in claim 1 wherein said mounting comprises a first and a second right angle bracket attached to said mounting wall.

5. A device as defined in claim 1 wherein said mounting comprises: a fixed hinge plate attached to said mounting wall; a movable hinge plate; and a means constituting a movable joint between said plates.

6. A device as defined in claim 5 wherein said resilient means comprise spring means normally urging said movable hinge plate against said mounting wall away from said fixed hinge plate.

7. A device as defined in claim 1 wherein said mounting comprises a mounting plate attached to said mounting wall and a lever movably attached to said mounting plate.

8. A device as defined in claim 7 wherein hinge means are attached to said mounting wall, and wherein positioning means are attached to said hinge means, said positioning means having side members adapted to slidably engage adjacent wall surfaces of the mounting wall.

9. A device as defined in claim 8 wherein said positioning means comprises a scoop-shaped member, said scoop-shaped member having at one end thereof, means adapted to slidably engage adjacent side wall surfaces of the mounting wall.

10. A device as defined in claim 1 wherein a scoop-shaped member is pivotally attached to said mounting wall, said scoop-shaped member having one or more parts thereof adapted to slidably engage adjacent side wall surfaces of the mounting wall.

JOHN K. RUSSELL.

References Cited in the file of this patent

UNITED STATES PATENTS

| Number | Name | Date |
|---|---|---|
| 84,885 | Leach et al. | Dec. 15, 1868 |
| 446,827 | Cass | Feb. 17, 1891 |
| 803,134 | Rhodes | Oct. 31, 1905 |
| 1,295,448 | Dingwell | Feb. 25, 1919 |